US010938577B2

(12) United States Patent
Tang (10) Patent No.: US 10,938,577 B2
(45) Date of Patent: Mar. 2, 2021

(54) BLOCKCHAIN SERVICE ACCEPTANCE AND CONSENSUS METHOD AND DEVICES

(71) Applicant: Alibaba Group Holding Limited, George Town (KY)

(72) Inventor: Qiang Tang, Chengdu (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

(21) Appl. No.: 16/502,523

(22) Filed: Jul. 3, 2019

(65) Prior Publication Data

US 2019/0327097 A1 Oct. 24, 2019

Related U.S. Application Data

(63) Continuation of application No. PCT/CN2018/087603, filed on May 21, 2018.

(30) Foreign Application Priority Data

May 22, 2017 (CN) .......................... 201710362162.3

(51) Int. Cl.
*H04L 9/32* (2006.01)
*G06F 16/182* (2019.01)
*H04L 9/06* (2006.01)

(52) U.S. Cl.
CPC ........ *H04L 9/3255* (2013.01); *G06F 16/1827* (2019.01); *H04L 9/0637* (2013.01)

(58) Field of Classification Search
CPC ..... H04L 9/3255; H04L 9/0637; H04L 67/10; H04L 67/1097; H04L 67/2847; H04L 67/2852; H04L 67/32; G06F 16/1827
(Continued)

(56) References Cited

U.S. PATENT DOCUMENTS 7,409,485 B1* 8/2008 Sartin .................. G06F 13/128
710/106
7,783,666 B1* 8/2010 Zhuge .................. G06F 16/122
707/783
(Continued)

FOREIGN PATENT DOCUMENTS

CN 101414917 4/2009
CN 104679830 6/2015
(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.
(Continued)

*Primary Examiner* — Aravind K Moorthy
(74) *Attorney, Agent, or Firm* — Fish & Richardson P.C.

(57) ABSTRACT

This specification describes techniques for handling a blockchain service. A service request sent by a client is received by a first application of a first consensus node of a blockchain network, where the first consensus node includes the first application, a second application, and a database. To-be-sent service data is determined based on the service request. The to-be-sent service data is stored in the database by the first application. A determination is made as to whether a predetermined condition is satisfied. If it is determined that the predetermined condition is satisfied, the to-be-sent service data is retrieved from the database by the first application or the second application. The to-be-sent service data is transmitted to a second consensus node of the blockchain network.

20 Claims, 5 Drawing Sheets

(58) Field of Classification Search
USPC ........................................................ 713/180
See application file for complete search history.

(56) References Cited

U.S. PATENT DOCUMENTS

| | | | |
|---|---|---|---|
| 9,436,923 B1 | 9/2016 | Sriram et al. | |
| 9,462,044 B1* | 10/2016 | Preibisch | H04L 67/10 |
| 10,567,499 B1* | 2/2020 | Chen | G06F 11/20 |
| 10,684,925 B2* | 6/2020 | Tang | G06F 11/2041 |
| 2006/0117321 A1* | 6/2006 | Lauer | G06F 9/547 |
| | | | 719/313 |
| 2008/0155224 A1* | 6/2008 | Crandall | G06F 12/10 |
| | | | 711/203 |
| 2011/0060637 A1* | 3/2011 | Sakai | G06Q 30/02 |
| | | | 705/14.26 |
| 2012/0185939 A1* | 7/2012 | Turbin | G06F 21/562 |
| | | | 726/24 |
| 2012/0330611 A1* | 12/2012 | Libal | G07C 9/00 |
| | | | 702/179 |
| 2013/0198281 A1* | 8/2013 | Scuba | H04W 12/02 |
| | | | 709/204 |
| 2015/0118991 A1* | 4/2015 | Chung | G06Q 20/14 |
| | | | 455/406 |
| 2016/0026983 A1* | 1/2016 | Lindsley | G06Q 20/123 |
| | | | 705/26.81 |
| 2016/0044038 A1* | 2/2016 | Kementsietsidis | |
| | | | G06F 16/24568 |
| | | | 726/7 |
| 2016/0154837 A1* | 6/2016 | Zhou | G06F 16/245 |
| | | | 707/812 |
| 2016/0286059 A1* | 9/2016 | Hitaka | H04N 1/00344 |
| 2016/0321676 A1 | 11/2016 | McCoy et al. | |
| 2016/0364807 A1* | 12/2016 | Okamoto | G06Q 50/06 |
| 2016/0381005 A1* | 12/2016 | Vij | H04L 63/0823 |
| | | | 726/7 |
| 2017/0109137 A1* | 4/2017 | Subramanian | G06F 9/454 |
| 2017/0374568 A1* | 12/2017 | Heath | H04W 48/02 |
| 2018/0101560 A1* | 4/2018 | Christidis | G06F 16/215 |
| 2018/0253451 A1* | 9/2018 | Callan | H04L 63/123 |
| 2019/0068380 A1* | 2/2019 | Tang | G06F 16/2379 |
| 2019/0089785 A1* | 3/2019 | Dotzler | H04L 67/2833 |
| 2019/0122186 A1* | 4/2019 | Kano | G06F 21/64 |
| 2019/0238340 A1* | 8/2019 | Wang | G06F 16/1824 |
| 2019/0245856 A1* | 8/2019 | Irwan | G06F 15/16 |
| 2019/0288854 A1* | 9/2019 | Xie | H04L 63/08 |
| 2019/0354977 A1* | 11/2019 | Tang | G06Q 20/3829 |
| 2020/0065872 A1* | 2/2020 | Tang | G06Q 30/0609 |

FOREIGN PATENT DOCUMENTS

| | | |
|---|---|---|
| CN | 105404701 | 3/2016 |
| CN | 105976231 | 9/2016 |
| CN | 106228446 | 12/2016 |
| CN | 106372868 | 2/2017 |
| CN | 106411774 | 2/2017 |
| CN | 106446067 | 2/2017 |
| CN | 106534273 | 3/2017 |
| CN | 106611061 | 5/2017 |
| CN | 106650494 | 5/2017 |
| CN | 107395665 | 11/2017 |
| EP | 3324355 | 5/2018 |
| KR | 20150032190 | 3/2015 |
| WO | WO 2017010544 | 1/2017 |
| WO | WO 2017079218 | 5/2017 |

OTHER PUBLICATIONS

Nakamoto, "Bitcoin: A Peer-to-Peer Electronic Cash System," www.bitcoin.org, 2005, 9 pages.

PCT International Search Report and Written Opinion in International Application No. PCT/CN2018/087603, dated Aug. 16, 2018, 9 pages (with partial English translation).

Antonopoulos, "Mastering Bitcoin—Unlocking Digital Cryptocurrencies," O'Reilly Media, Beijing Cambridge Farnham Koln Sebastopol Tokyo, Dec. 20, 2014, 286 pages.

Extended European Search Report in European Application No. 18806911.6 dated Jan. 16, 2020; 8 pages.

International Preliminary Report on Patentability in International Application No. PCT/CN2018/087603, dated Nov. 26, 2019, 9 pages (with English translation).

Bozic et al., "A Tutorial on Blockchain and Application to Secure Network Control-Plane," 2016 3rd Smart Cloud Networks & Systems (SCNS), IEEE, Dec. 2016, 8 pages.

* cited by examiner

FIG. 5

BLOCKCHAIN SERVICE ACCEPTANCE AND CONSENSUS METHOD AND DEVICES

CROSS-REFERENCE TO RELATED APPLICATIONS

This application is a continuation of PCT Application No. PCT/CN2018/087603, filed on May 21, 2018, which claims priority to Chinese Patent Application No. 201710362162.3, filed on May 22, 2017, and each application is hereby incorporated by reference in its entirety.

TECHNICAL FIELD

The present application relates to the field of information technologies, and in particular, to a blockchain service acceptance and consensus method and apparatus.

BACKGROUND

With the development of information technologies, as emerging technologies, the blockchain technologies have attracted great attention from people because of their advantages such as openness, non-changeability, and decentralization.

In existing blockchain technologies, each consensus node in a blockchain network can handle a service request sent by a client. One consensus node is used as an example for description. After receiving the service request, the consensus node may first determine corresponding service data based on the service request. Then, the consensus node may broadcast the service data to another consensus node. After receiving a preprocessed block sent by another consensus node, the consensus node may further perform consensus verification on the preprocessed block, and may store the preprocessed block after the preprocessed block passes the verification.

After handling the service request, the consensus node usually stores the service data corresponding to the service request in a cache of the consensus node. After the service data subsequently passes the consensus verification, the service data is released from the cache. Similarly, service data sent by another consensus node may also be stored in the cache and released after passing the consensus verification.

For the consensus node, data that is not stored in a blockchain is usually temporarily stored in the cache of the consensus node. Therefore, when the consensus verification is performed, an amount of verifiable service data is limited by a cache capacity of the consensus node, and efficiency of the consensus verification is limited. In addition, when the cache space of the consensus node is insufficient, the consensus node has difficulty in processing the received service request.

SUMMARY

Implementations of the present application provide a blockchain service handling method and a blockchain service consensus method, to resolve a problem of low service execution efficiency in existing blockchain technologies.

The implementations of the present application provide a blockchain service handling apparatus and a blockchain service consensus apparatus, to resolve a problem of low service execution efficiency in existing blockchain technologies.

The following technical solutions are used in the implementations of the present application.

A blockchain service handling method is provided, where a consensus node includes a first application, a second application, and a database, and the method includes: receiving, by the first application, a service request sent by a client, and determining corresponding to-be-sent service data based on the service request; storing, by the first application, the to-be-sent service data in the database; and when a predetermined condition is satisfied, fetching, by the second application or the first application, the to-be-sent service data from the database and sending the to-be-sent service data to another consensus node for storage.

A blockchain service consensus method is provided, where a first consensus node includes a first application, a second application, and a first database, and the method includes: receiving, by the first application, consensus data, and storing the consensus data in the first database; fetching, by the second application, the consensus data from the first database, and performing consensus verification; and adding, by the second application, a verification result to the consensus data, storing the verification result in the first database, and sending the verification result to another consensus node to continue performing the consensus verification.

A blockchain service handling apparatus is provided, where a consensus node includes the apparatus, the second application, and a database, and the apparatus includes: a receiving module, configured to receive a service request sent by a client, and determine corresponding to-be-sent service data based on the service request; and a storage module, configured to store the to-be-sent service data in the database, where when a predetermined condition is satisfied, the second application or a sending module fetches the to-be-sent service data from the database and sends the to-be-sent service data to another consensus node for storage.

A blockchain service consensus apparatus is provided, where the first consensus node includes a receiving module, a processing and sending module, and the first database, where the receiving module is configured to receive consensus data, and store the consensus data in the first database; the processing and sending module is configured to fetch the consensus data from the first database, and perform consensus verification; and the processing and sending module is configured to add a verification result to the consensus data, store the verification result in the first database, and send the verification result to another consensus node to continue performing the consensus verification.

At least one of the previously described technical solutions used in the implementations of the present application can achieve the following beneficial effects:

The consensus node includes the first application, the second application, and the database. The database is configured to store service data obtained after the first application and the second application perform processing, to reduce cache pressure of the consensus node. It can be seen that, by using the methods provided in the implementations of the present application, provided that the consensus node determines the service data corresponding to the service request, the consensus node can store the service data in the database, the consensus node waits to send the service data to another consensus node, and therefore, a cache occupancy rate of the consensus node is relatively low. Therefore, the number of services that can be processed by the consensus node in unit time is increased, and consensus verification efficiency and service request processing efficiency of the consensus node are improved.

BRIEF DESCRIPTION OF DRAWINGS

The accompanying drawings described here are intended to provide a further understanding of the present application, and constitute a part of the present application. The illustrative implementations of the present application and descriptions thereof are intended to describe the present application, and do not constitute limitations on the present application. In the accompanying drawings, details are as follows.

DESCRIPTION OF IMPLEMENTATIONS

To make the objectives, technical solutions, and advantages of the present application clearer, the following clearly and completely describes the technical solutions of the present application with reference to specific implementations and accompanying drawings of the present application. Apparently, the described implementations are merely some rather than all of the implementations of the present application. All other implementations obtained by a person of ordinary skill in the art based on the implementations of the present application without creative efforts shall fall within the protection scope of the present application.

The technical solutions provided in the implementations of the present application are described in detail below with reference to the accompanying drawings.

Figure 1:
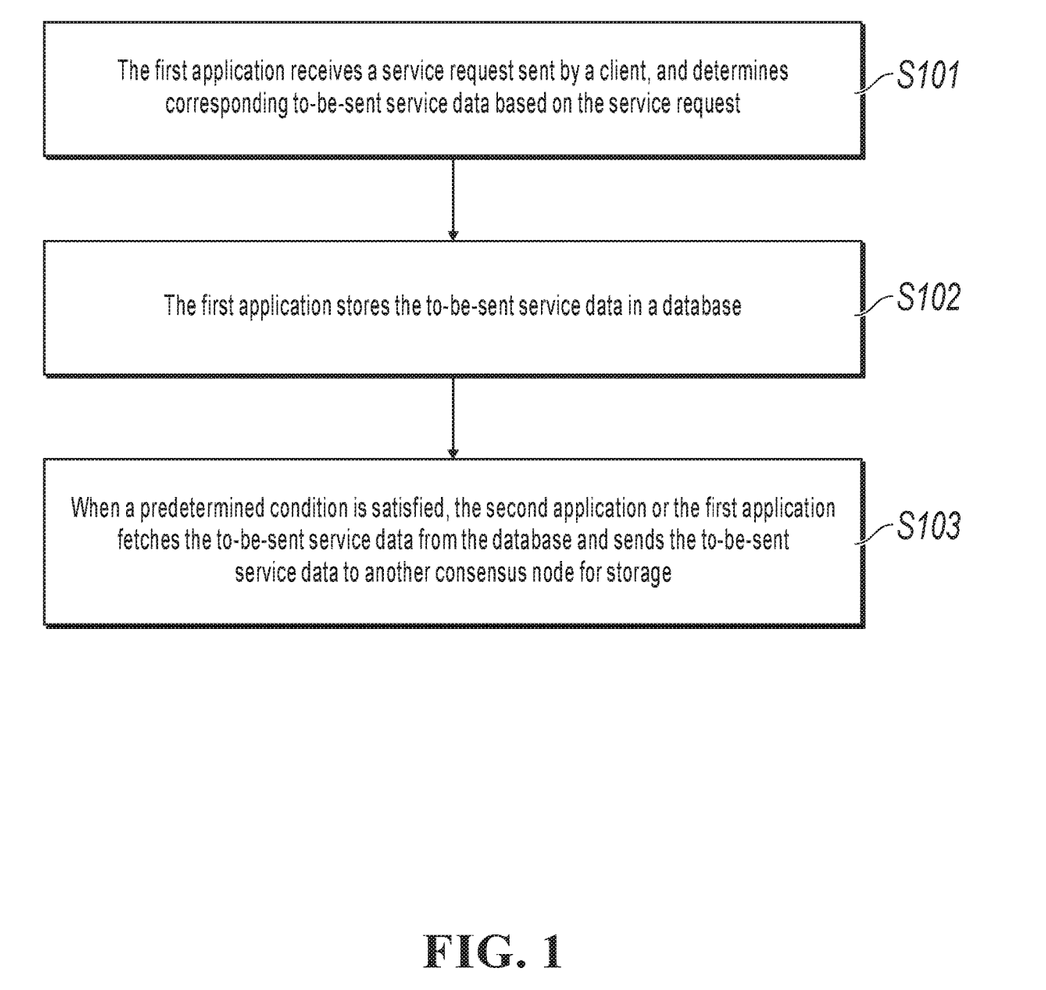
FIG. 1 illustrates a blockchain service handling process, according to an implementation of the present application.

FIG. 1 illustrates a blockchain service consensus process, according to an implementation of the present application. A consensus node includes a first application, a second application, and a database. The blockchain service consensus process may specifically include the following steps:

S101. The first application receives a service request sent by a client, and determines corresponding to-be-sent service data based on the service request.

In the implementation of the present application, each consensus node in a blockchain network may include one or more blockchain applications and databases. The blockchain application can handle a service request and perform consensus verification on a preprocessed block. The database is configured to store service data (for example, data generated in a consensus verification process, and data generated after a service request is handled) determined by the blockchain application.

Further, a user usually needs to send an instruction or a request by using the client. Subsequently, the consensus node can receive the service request sent by the client, and perform subsequent steps based on the service request.

The consensus node can receive service requests sent by a plurality of clients, and perform service processing based on the service requests. The consensus node may be an end-user device, for example, a device such as a mobile phone, a tablet computer, or a personal computer. The consensus node may alternatively be a server, and the server may be a separate device or may be a system including a plurality of devices, for example, a distributed server. The present application sets no specific limitation on a specific device type of the consensus node.

Specifically, when receiving the service request, the consensus node may receive the service request by using the first application installed in the consensus node. In addition, in the subsequent steps, the first application determines corresponding service logic based on the service request, and allocates a thread to perform the service. Certainly, there may be a plurality of application programs (for example, the second application) installed in the consensus node. As such, the application programs may separately receive service requests sent by different clients, and separately perform subsequent operations. For ease of description, in the implementation of the present application, that the consensus node includes only the first application and the second application is used as an example for description. However, the implementation of the present application sets no limitation on the possibility that there are more applications in the consensus node.

Further, the consensus node may alternatively be a system including a plurality of devices, and a blockchain application is correspondingly installed in each device. As such, the devices may separately receive, by using installed blockchain applications, service requests sent by different clients, and independently perform subsequent operations.

In addition, regardless of whether the consensus node includes a plurality of installed application programs or a plurality of devices, the consensus node may be considered, in the blockchain network, as a node that handles a service request and can initiate consensus verification. Specific components of the consensus node may be configured based on a need. For example, when service requests frequently wait to be processed because of the relatively great operating pressure of the consensus node, more applications or devices may be configured for the consensus node.

Still further, in the implementation of the present application, after performing service processing on the received service request, the first application may use a service processing result as service data. In addition, because the service data has not been sent to another consensus node, the first application may still determine that a state of the service data is a "to be sent" state. The service data and the corresponding "to be sent" state of the service data are stored in the database.

Alternatively, after determining the service data, the first application may add a "to be sent" identifier to the service data. Then, the service data in which the "to be sent" identifier is added is stored in the database as the to-be-sent service data. The second application can determine the service data as the to-be-sent service data based on the "to be sent" identifier.

The present application sets no limitation on a method in which the consensus node determines the state of the service data, provided that each application or device in the consensus node may determine the state of the stored service data when accessing the database.

For example, if the user needs to perform a transaction service, the service request sent by the user may include data such as identity information of both transaction parties, a transaction amount, and payer account information. The first application of the consensus node may determine and create a corresponding transaction service based on the data included in the service request. After determining the service data, the first application adds a "to be sent" identifier to the service data.

The "to be sent" identifier may alternatively be added to the service data as a service attribute in the service data. For example, Table 1 shows a schematic structure of the service data.

TABLE 1

| Service attribute | Content |
| --- | --- |
| Service identifier | Unique identifier in a blockchain |
| Version | Blockchain version identifier used when a service is created |
| Time stamp | Time stamp used when a service is created |
| Service information | Specific content of a service |
| State identifier | "To be sent" identifier |

The state identifier in the schematic structure of the service data that is shown in Table 1 may be added to the service data by the first application of the consensus node. Based on the state identifier, any application in the consensus node can determine that a current state of the service data is a "to be sent" state. When an operation is subsequently performed on the service data, it may be determined, based on the state identifier, that the service data needs to be sent to another consensus node.

Certainly, in the implementation of the present application, specific content included in the service data and specific attributes included in service attributes are not specifically limited in the present application.

S102. The first application stores the to-be-sent service data in a database.

In the implementation of the present application, a process of determining the to-be-sent service data in step S101 depends on a cache of the consensus node, and therefore, the service data is also stored in the cache. Therefore, the first application may further transfer and store the service data to the database of the consensus node, to release cache space to perform another service.

Specifically, the database may be a storage device used by the consensus node to store data, and may be a storage device that uses a non-volatile memory. Certainly, the database and the consensus node may be located in the same device (for example, the database may be located in a hard disk of a personal computer), or may be located in different devices (for example, an external removable hard disk). Implementations are not specifically limited in the present application.

In addition, when a plurality of blockchain applications are installed in the consensus node, the applications may separately receive service requests sent by different clients. In addition, the applications store, in the database, service data separately determined by the applications. As such, the database may be considered as a database shared by the applications and all the applications can have permission to access the database. In other words, the second application may also determine to-be-sent service data and store the to-be-sent service data in the database.

Further, as described in step S101, the consensus node may be the system that includes a plurality of devices. Therefore, when the consensus node is the system that includes a plurality of devices, all the devices of the consensus node may access the database, and the database may be considered, within the consensus node, as a storage device shared by the devices.

Therefore, the first application of the consensus node stores the to-be-sent service data in the database, and releases the cache space occupied by the service data, to perform another service. As such, the consensus node can handle more service requests without adding hardware configuration of the consensus node.

S103. When a predetermined condition is satisfied, the second application or the first application fetches the to-be-sent service data from the database and sends the to-be-sent service data to another consensus node for storage.

In the implementation of the present application, after the first application of the consensus node stores the to-be-sent service data in the database, the first application of the consensus node can continue to receive a service request sent by another client, and perform operations that are the same as those in step S101 and step S102 (likewise, the second application of the consensus node may also synchronously perform operations that are the same as those in step S101 and step S102). Therefore, the database corresponding to the consensus node may store several pieces of to-be-sent service data. To ensure other consensus nodes to perform the consensus verification normally, service data stored in the database of the consensus node further needs to be sent to another consensus node for storage.

Therefore, in the implementation of the present application, when the predetermined condition is satisfied, the first application or the second application of the consensus node may further fetch the to-be-sent service data from the database, and send the to-be-sent service data to another consensus node for storage, so that another consensus node subsequently performs the consensus verification. In addition, after the to-be-sent service data is sent, the to-be-sent service data may be updated to the sent service data.

Specifically, at least one of the first application or the second application in the consensus node may determine, based on the current state of the consensus node, whether the predetermined condition is satisfied. If yes, the first application and/or the second application can fetch and send the to-be-sent service data; if no, the first application and/or the second application cannot fetch the to-be-sent service data.

When an amount of to-be-sent service data stored in the database of the consensus node reaches a predetermined threshold, it is determined that the current state of the consensus node satisfies the predetermined condition. Alternatively, when a specified moment arrives, it is determined, based on a sending period of the consensus node, that the predetermined condition is satisfied. In other words, the to-be-sent service data in the data is periodically fetched.

Certainly, the predetermined condition may alternatively be set based on an actual need. For example, the predetermined condition may also change when time or service volume changes. At nighttime (for example, 0:00 am to 4:00 am), a time interval for fetching service data is increased, or when the service volume is increased, a time interval for fetching service data is reduced, and so on. Implementations are not specifically limited in the present application.

In addition, when fetching to-be-sent service data, the first application or the second application can fetch and send all the to-be-sent service data in the database corresponding to the consensus node. Alternatively, a specified amount of to-be-sent service data may be fetched. Implementations are not specifically limited in the present application. In addition, one or any combination of the previously described conditions may be selected for use.

Further, when fetching the to-be-sent service data from the database, the first application or the second application can fetch pieces of to-be-sent service data based on a generation order of the pieces of to-be-sent service data, and send the fetched to-be-sent service data to another consensus node based on a fetching order. Specifically, the consensus node may fetch and send the to-be-sent service data piece by piece, or may fetch and pack the pieces of to-be-sent service data, and then send the pieces of to-be-sent service data to another consensus node.

Still further, the first application or the second application can further update, to the sent service data, the to-be-sent service data that is sent.

For example, after fetching service data F from the database and sending the service data F, the first application may update, to a "sent" state, a state corresponding to the service data F in the database. Alternatively, a state identifier in a service attribute of the service data F is updated to a sent identifier. In other words, when invoking the service data F, the first application may update the state identifier of the service data F.

Certainly, because of a problem such as a network delay or a device fault, a service data sending failure may occur. Therefore, in the implementation of the present application, after receiving response information returned by another consensus node for the sent service data, the first application or the second application may update the state identifier of the service data based on the response information. A specific used method is not specifically limited in the present application.

Based on the blockchain service handling method shown in FIG. 1, it can be seen that the consensus node may include the first application, the second application, and the database. The database is configured to store service data obtained after the first application and the second application perform service processing, to reduce cache pressure of the consensus node. The consensus node can continuously receive a service request and handle a service even when waiting for a consensus, without causing service waiting because of insufficient cache space. In addition, because all the service data is stored in the database, a number of installed applications may be increased for the consensus node based on a need. Therefore, the consensus node may simultaneously receive and process more service requests, to improve the working efficiency of the consensus node. In addition, when the predetermined condition is satisfied, the first application or the second application in the consensus node can fetch the to-be-sent service data stored in the database, and send the to-be-sent service data to another consensus node for storage. It can be seen that, by using the method provided in the present application, operation efficiency of the consensus node is no longer limited to a cache volume. In addition, all applications in the consensus node can handle service requests and send service data, and therefore, the consensus node can use some applications to send to-be-sent service data, and use some other applications to handle service requests, thereby improving consensus verification efficiency and service request processing efficiency of the consensus node.

In addition, in the implementation of the present application, when sending to-be-sent service data, the first application or the second application can first update a state of the service data to a "sent" state, so that service data received and stored by another consensus node is in the "sent" state. Therefore, when performing consensus verification based on the service data, another consensus node does not omit the service data sent by the first application or the second application.

Further, in the implementation of the present application, after receiving the service data sent by another consensus node, the first application may perform verification on the to-be-sent service data based on a hash value and specific content of the service data. After passing the verification, the service data is stored in the database.

Still further, in step S101 of the present application, same as that in the existing technology, when determining the service request, the consensus node may perform verification on data that is included in the service request and that is needed for service processing. In addition, after the data passes the verification, the consensus node continues to perform subsequent operations such as service creation and service processing. Specifically, a verification process and implementation details may be consistent with those in the existing technology. Details are omitted in the present application.

In addition, in the implementation of the present application, after determining the to-be-sent service data, the consensus node may return, to the client, response information corresponding to the service request, so that the client determines that the consensus node handles the service request. It is worthwhile to note that, when the consensus node determines the service data based on the service request, it may be considered that the consensus node handles the service request.

It is worthwhile to note that all the steps of the method provided in the implementation of the present application can be performed by the same device, or the method may be performed by different devices. For example, step S101 and step S102 can be performed by device 1, and step S103 can be performed by device 2. For another example, step S101 can be performed by device 1, and step S102 and step S103 can be performed by device 2.

Figure 2:
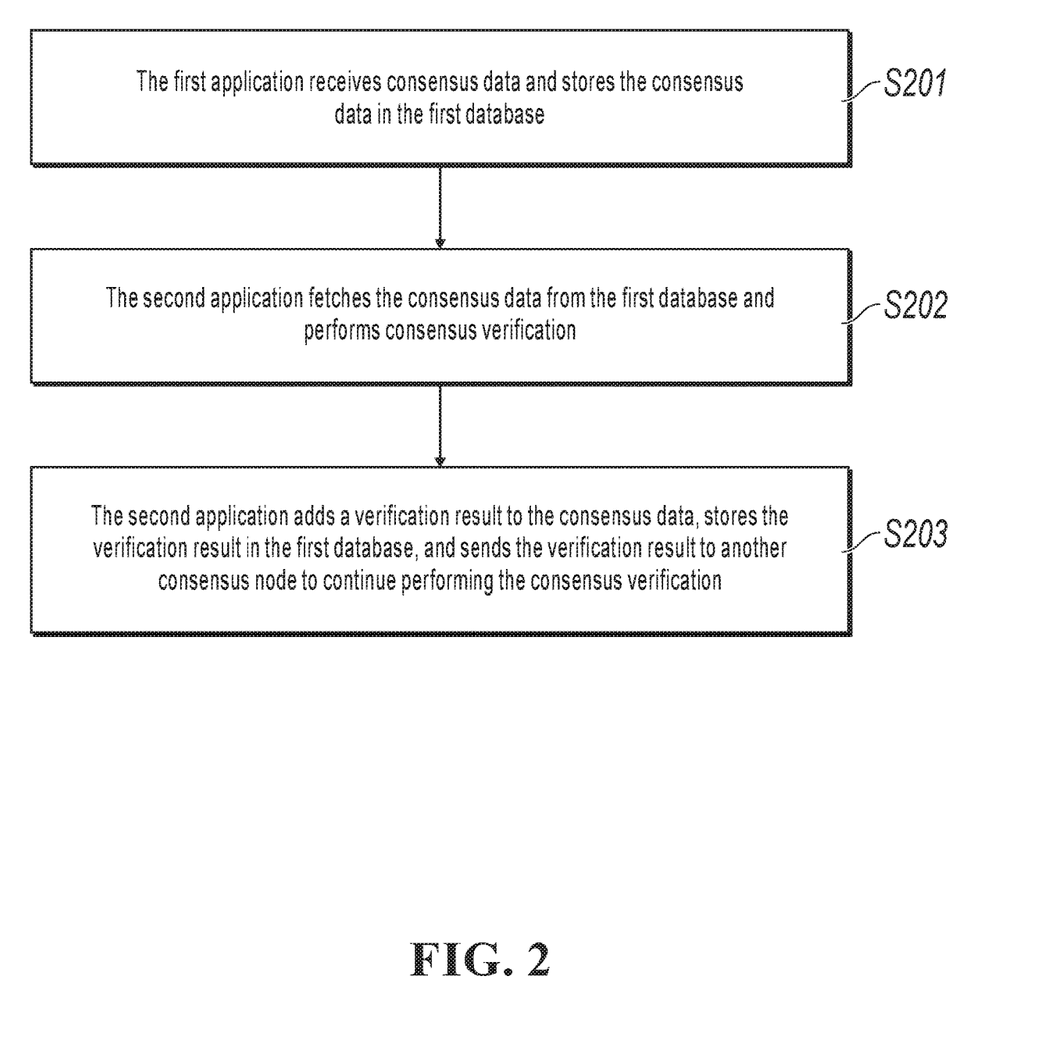
FIG. 2 illustrates a blockchain service consensus process, according to an implementation of the present application.

Based on the blockchain service handling method shown in FIG. 1, an implementation of the present application further correspondingly provides a blockchain service consensus method, as shown in FIG. 2.

FIG. 2 illustrates a blockchain service consensus process, according to an implementation of the present application. A first consensus node includes a first application, a second application, and a first database. The blockchain service consensus process specifically includes the following steps.

S201. The first application receives consensus data and stores the consensus data in the first database.

In the implementation of the present application, similar to the consensus node in the blockchain service handling process shown in FIG. 1, the first consensus node includes the first application, the second application, and the first database. In addition, the first consensus node may include more applications. Implementations are not limited in the present application. However, for ease of subsequent description, in the implementation of the present application, the first application and the second application are used as an example for description.

Usually, consensus nodes in the blockchain network can determine a consensus node for initiating consensus verification on a blockchain service consensus mechanism. Therefore, the first application of the first consensus node can receive consensus data, and store the consensus data in the first database.

In addition, in some consensus algorithms, the consensus node may determine, based on a verification result of another consensus node, whether to store the consensus data. For example, in some consensus algorithms, each consensus node needs to determine whether a verification result indicates that more than 50% of consensus nodes in the entire network pass the verification. If yes, the consensus node stores a preprocessed block; if no, the consensus node does not store a preprocessed block.

Therefore, a verification result may alternatively be considered as consensus data. In the present application, the consensus data may include data on which consensus verification needs to be performed (usually, the data is the preprocessed block) and a corresponding verification result.

Certainly, regardless of a form of consensus data received by the first application, the first application may store the consensus data in the first database.

S202. The second application fetches the consensus data from the first database and performs consensus verification.

In the implementation of the present application, the second application can fetch the consensus data from the first database, and perform verification on the consensus data, to perform a subsequent operation.

Specifically, the second application can fetch the consensus data (which may be specifically a preprocessed block) from the first database and the service data in the "sent" state in the first database, perform the consensus verification on the consensus data based on the service data in the "sent" state, and determine a verification result.

S203. The second application adds a verification result to the consensus data, stores the verification result in the first database, and sends the verification result to another consensus node to continue performing the consensus verification.

In the implementation of the present application, after determining the verification result, the second application may store the verification result in the first database, and send the verification result to another consensus node to continue performing the consensus verification. Whether the second application stores the verification data before sending the verification data or the second application sends the verification data before storing the verification data is not limited in the present application.

In addition, in step S201 to step S203 in the implementation of the present application, a blockchain service consensus mechanism may be the Practical Byzantine Fault Tolerance (PBFT) algorithm, and a primary node may be determined from consensus nodes in the blockchain network based on an equation: View ID/M, and the primary node initiates consensus verification. Each consensus node can first determine a current period (namely, View) of the consensus node, and View ID represents an identifier of the current period determined by the consensus node. Usually, an identifier of a period is a number from 0 to M−1, and M represents a total number of consensus nodes in the blockchain network.

Specifically, that the second consensus node is a primary node and initiates consensus verification and the first consensus node is the secondary node for performing consensus verification is used as an example for description. The second consensus node includes a third application, a fourth application, and a second database. The third application creates a preprocessed block based on service data in a "sent" state in the second database, and stores the preprocessed block in the second database. The fourth application fetches the preprocessed block from the second database, and sends the preprocessed block to consensus nodes other than the second consensus node.

First, the third application of the second consensus node may determine the second consensus node as the primary node by using the current View ID. As such, the third application may fetch, from the second database based on a predetermined consensus condition, the sent service data on which a consensus needs to be reached. The predetermined consensus condition may be set based on a need. Implementations are not specifically limited in the present application. For example, service data on which a consensus needs to be reached may be selected based on a time order, or sent service data that satisfies a capacity is selected based on a capacity of a preprocessed block, or the like.

In addition, the third application may create a corresponding preprocessed block based on the fetched and sent service data, for example, determine an arrangement order of the sent service data in the preprocessed block, and determine a header hash value of the preprocessed block by using Merkle trees. Specifically, in the implementation of the present application, a method that is the same as that in the existing technology may be used for creating the preprocessed block. Implementations are not specifically limited in the present application.

Further, the third application can determine, based on the first phase of a three-phase protocol of the PBFT, using the same method as that in the existing technology, pre-prepared information corresponding to the preprocessed block. A format of the pre-prepared information may be <pre-prepared, v, n, d>, v represents a number of a current view ID, n represents an identifier of the preprocessed block, and d is a digest of the preprocessed block. After signing the pre-prepared information, the third application can store the pre-prepared information and the preprocessed block in the second database.

Then, the fourth application can fetch the pre-prepared information and the preprocessed block from the second database, and send the pre-prepared information and the preprocessed block to consensus nodes other than the second consensus node. As such, another consensus node performs verification on the pre-prepared information. As described in step S201, the first application may receive the pre-prepared information and the preprocessed block, and store the pre-prepared information and the preprocessed block in the first database as the consensus data.

Then, as described in step S202, the second application can fetch consensus data (for example, the second application can fetch the pre-prepared information and the preprocessed block) from the first database, and perform consensus verification. Specifically, the second application can perform verification on the signature of the pre-prepared information, and determine that the pre-prepared information is sent by the second consensus node. Further, verification is performed on the digest of the pre-prepared information based on the service data in the preprocessed block, and the preprocessed block corresponds to the digest of the pre-prepared information is determined. In addition, it may be determined whether n in the pre-prepared information satisfies a predetermined watermark, and it may be determined whether v in the pre-prepared information is consistent with current v of the first consensus node.

Because a consensus node that determines that the pre-prepared information passes verification during the PBFT automatically performs a next phase (namely, the second phase), after the pre-prepared information passes verification performed by the second application, the second application can store the pre-prepared information, the preprocessed block, and received response information in the first database, and create prepared information as a verification result. A format of the prepared information may be <prepared, v, n, d, i>, and i is an identifier of a consensus node that creates the prepared information. Therefore, the second application may further store the prepared information in the first database.

Then, the second application may send the prepared information to another consensus node to continue performing consensus verification. In addition, another consensus node that determines that the pre-prepared information passes verification may sign and then broadcast the prepared information created by the consensus node. Therefore, each consensus node in the blockchain network can receive prepared information sent by a consensus node that determines that the pre-prepared information passes verification, and each consensus node can store, in a database of the consensus node, received prepared information sent by another consensus node.

Therefore, in the implementation of the present application, the first application of the first consensus node may receive a verification result sent by another consensus node (namely, prepared information sent by another consensus node) again, and store the verification result in the first database. The second application may perform verification on v, n, a signature, and a digest of the prepared information stored in the first database. When determining that an amount of prepared information that is stored in the first database and that passes the verification is greater than or equal to a predetermined amount, the second application automatically performs a next phase (namely, the third phase). The predetermined amount is the same as that in the existing technology, and is determined by the consensus node through PBFT calculation. Details are omitted in the present application.

Then, in the third phase of the three-phase protocol, when determining that the third phase is to be performed, the second application can create conformation information ("Commit information"), and send the Commit information to another consensus node. Likewise, when determining that the third phase is to be performed, the third application or the fourth application of the second consensus node may also send Commit information. The first application may receive Commit information sent by another consensus node and store the Commit information in the first database. A format of the Commit information may be <commit, v, n, D, i>, and D is a digest of a preprocessed block created by a consensus node.

Finally, the second application can perform verification on v, n, a signature, and a digest of the Commit information that is stored in the first database and that is sent by another consensus node; and when it is determined that an amount of Commit information that passes the verification is greater than or equal to a predetermined amount, it is determined that the preprocessed block passes the consensus verification.

For each consensus node in the blockchain network, in each phase of the three-phase protocol, all data such as information received from another consensus node and created information that is generated when the consensus node performs consensus verification can be stored in a database corresponding to the consensus node.

Certainly, it is worthwhile to note that in the implementation of the present application, the previously described steps performed by the second application may be performed by the first application, and vice versa. Likewise, all steps performed by the third application may also be performed by the fourth application, and vice versa.

In addition, in a three-phase protocol execution process, each consensus node needs to send and receive information about another consensus node, and a network delay may occur when information is transmitted through a network. Therefore, in each phase of the three-phase protocol, each consensus node may wait for a moment to receive information. Thus, during the three-phase protocol execution process, the consensus node may first store the created information and the received information in the database. In addition, when the waiting time of each phase ends, it is determined, based on the information stored in the database, whether to perform the next phase.

Further, in the implementation of the present application, in the first phase of the three-phase protocol (namely, a pre-prepared phase), the second consensus node (namely, the primary node) that initiates consensus verification can send the preprocessed block and hash values of the service data in the preprocessed block to each consensus node of the second consensus node. In addition, each consensus node that receives the pre-prepared information may create a preprocessed block based on the hash values of the service data, and perform comparison verification on the created preprocessed block and the preprocessed block sent by the primary node.

Still further, in the implementation of the present application, when each consensus node performs the consensus verification, same as that in the existing technology, the consensus node may perform verification based on a consensus condition. In other words, it is determined whether service data sent by the primary node is service data on which the consensus verification can be performed. If yes, the consensus node continues performing subsequent consensus verification; if no, the consensus node stops the consensus verification.

Based on the blockchain service consensus method shown in FIG. 2, the first consensus node includes the first application, the second application, and the first database. When consensus is performed, the first application receives consensus data and stores the consensus data in the first database. The second application fetches consensus data from the first database, and performs the consensus verification; and the second application adds a verification result to the consensus data, stores the verification result in the first database, and sends the verification result to another consensus node to continue performing the consensus verification. The third application of the second consensus node that initiates the consensus verification creates, based on the sent service data stored in the second database, a preprocessed block as the consensus data and stores the consensus data in the second database; and the fourth application fetches the consensus data from the second database and sends the consensus data to consensus nodes other than the second consensus node. It can be seen that, in the implementation of the present application, the consensus node may use the three-phase protocol of the PBFT to reach consensus, and store, in the database, data generated at each phase, to reduce a cache occupancy rate during consensus verification and improve cache utilization. Therefore, consensus verification efficiency and service request processing efficiency of the consensus node are improved.

It is worthwhile to note that all the steps of the method provided in the implementation of the present application can be performed by the same device, or the method may be performed by different devices. For example, step S201 and step S202 can be performed by device 1, and step S203 can be performed by device 2. For another example, step S201 can be performed by device 1, and step S202 and step S203 can be performed by device 2.

Figure 3:
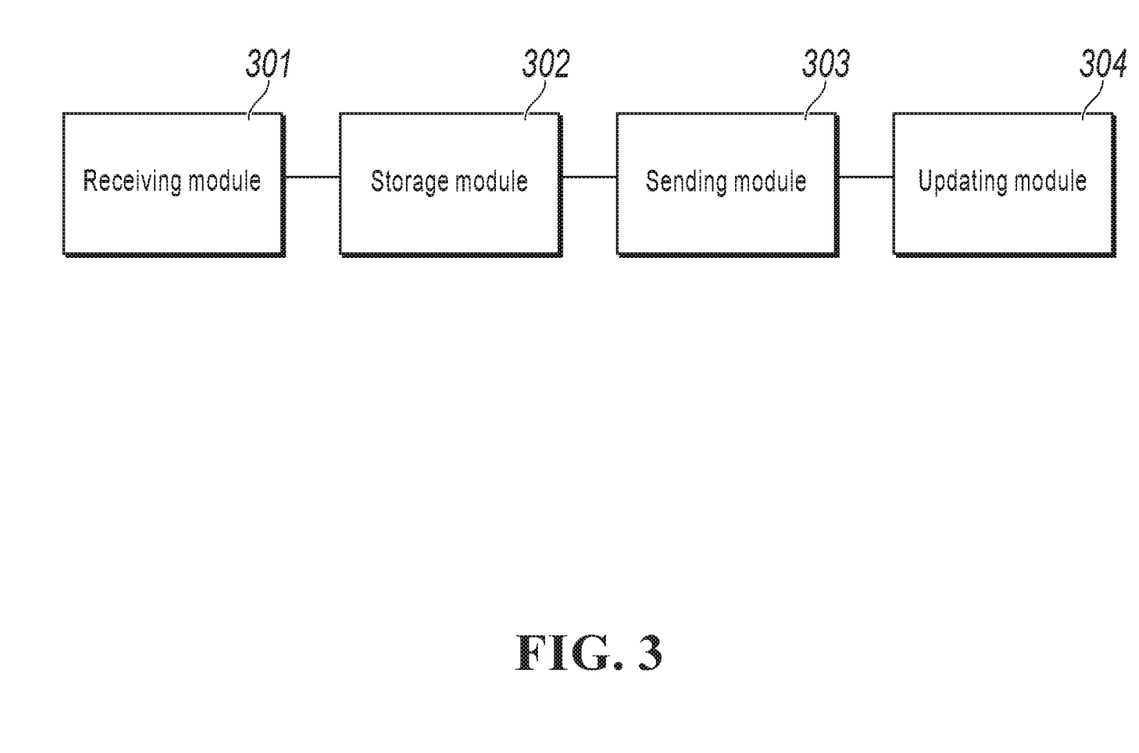
FIG. 3 is a schematic structural diagram illustrating a blockchain service handling apparatus, according to an implementation of the present application.

Based on the blockchain service handling method shown in FIG. 1, an implementation of the present application further correspondingly provides a blockchain service handling apparatus, as shown in FIG. 3.

FIG. 3 is a schematic structural diagram illustrating a blockchain service handling apparatus, according to an implementation of the present application. A consensus node includes the apparatus, a second application, and a database. The apparatus includes: a receiving module 301, configured to receive a service request sent by a client, and determine corresponding to-be-sent service data based on the service request; and a storage module 302, configured to store the to-be-sent service data in the database, where when a predetermined condition is satisfied, the second application or a sending module 303 fetches the to-be-sent service data from the database and sends the to-be-sent service data to another consensus node for storage.

The storage module 302 determines that a state of the to-be-sent service data is a "to be sent" state, and stores the service data and the corresponding "to be sent" state of the service data.

When a specified moment arrives, it is determined that the predetermined condition is satisfied.

The sending module 303 fetches a specified amount of to-be-sent service data from the database.

The apparatus further includes: an updating module 304, configured to update a state of sent service data in the database to a "sent" state.

Specifically, the blockchain service handling apparatus may be located in the consensus node. The consensus node may be an end-user device, for example, a device such as a mobile phone, a tablet computer, or a personal computer. Alternatively, the consensus node may be a server, for example, a separate server or a system including a plurality of servers.

Figure 4:
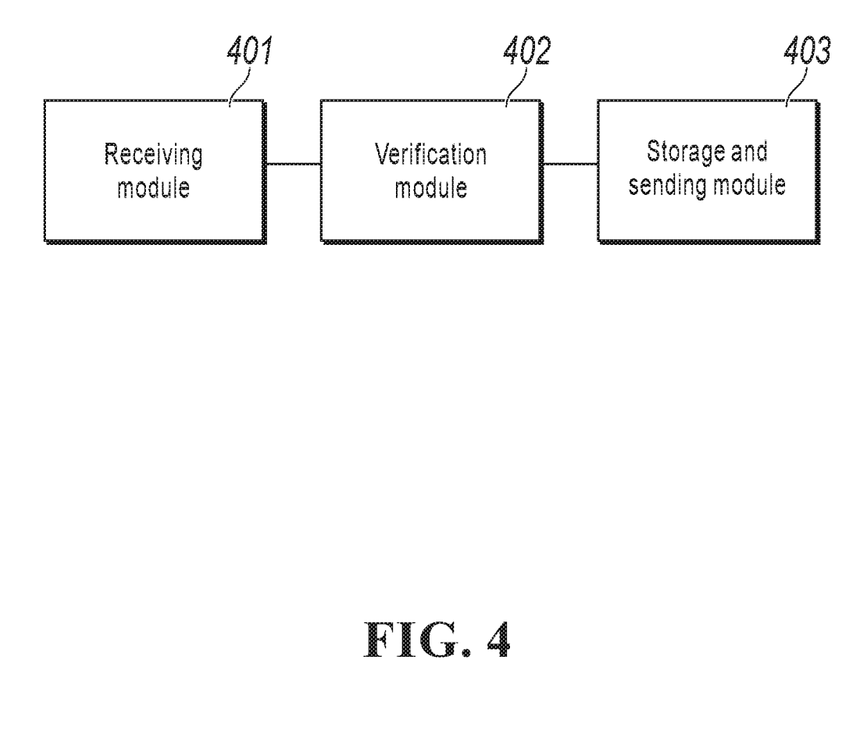
FIG. 4 is a schematic structural diagram illustrating a blockchain service consensus apparatus, according to an implementation of the present application.

Based on the blockchain service consensus method shown in FIG. 2, an implementation of the present application further correspondingly provides a blockchain service consensus apparatus, as shown in FIG. 4.

FIG. 4 is a schematic structural diagram illustrating a blockchain service consensus apparatus, according to an implementation of the present application. A consensus node includes the first application, the apparatus, and the first database, and the apparatus includes: a receiving module 401, configured to receive consensus data, and store the consensus data in the first database; a verification module 402, configured to fetch the consensus data from the first database, and perform consensus verification; and a storage and sending module 403, configured to add a verification result to the consensus data, store the verification result in the first database, and send the verification result to another consensus node to continue performing the consensus verification.

The receiving module 401 receives consensus data sent by another consensus node; or receives a verification result sent by another consensus node, and uses the verification result as the consensus data.

The verification module 402 fetches the consensus data from the first database and service data in a "sent" state in the first database, performs consensus verification on the consensus data based on the service data in the "sent" state, and determines a verification result.

The second consensus node includes a third application, a fourth application, and a second database. Before the receiving module 401 receives the consensus data, the third application determines the consensus data based on service data in a "sent" state in the second database, and stores the consensus data in the second database; and the fourth application fetches the consensus data from the second database, and sends the consensus data to consensus nodes other than the second consensus node.

The Practical Byzantine Fault Tolerance PBFT algorithm is used for the consensus verification.

Specifically, the blockchain service handling apparatus shown in FIG. 4 may be located in the consensus node. The consensus node may be an end-user device, for example, a device such as a mobile phone, a tablet computer, or a personal computer. Alternatively, the consensus node may be a server, for example, a separate server or a system including a plurality of servers.

In the 1990s, whether a technical improvement is a hardware improvement (for example, an improvement to a circuit structure, such as a diode, a transistor, or a switch) or a software improvement (an improvement to a method procedure) can be clearly distinguished. However, as technologies develop, current improvements to many method procedures can be considered as direct improvements to hardware circuit structures. A designer usually programs an improved method procedure into a hardware circuit, to obtain a corresponding hardware circuit structure. Therefore, a method procedure can be improved by using a hardware entity module. For example, a programmable logic device (PLD) (for example, a field programmable gate array (FPGA)) is such an integrated circuit, and a logical function of the PLD is determined by a user through device programming. The designer performs programming to "integrate" a digital system to a PLD without requesting a chip manufacturer to design and produce an application-specific integrated circuit chip. In addition, at present, instead of manually manufacturing an integrated chip, this type of programming is mostly implemented by using "logic compiler" software. The programming is similar to a software compiler used to develop and write a program. The original code needs to be written in a particular programming language for compilation. The language is referred to as a hardware description language (HDL). There are many HDLs, such as the Advanced Boolean Expression Language (ABEL), the Altera Hardware Description Language (AHDL), Confluence, the Cornell University Programming Language (CUPL), HDCal, the Java Hardware Description Language (JHDL), Lava, Lola, MyHDL, PALASM, and the Ruby Hardware Description Language (RHDL). The very-high-speed integrated circuit hardware description language (VHDL) and Verilog are most commonly used. A person skilled in the art should also understand that a hardware circuit that implements a logical method procedure can be readily obtained once the method procedure is logically programmed by using the several described hardware description languages and is programmed into an integrated circuit.

A controller can be implemented by using any appropriate method. For example, the controller can be a microprocessor or a processor, or a computer-readable medium that stores computer-readable program code (such as software or firmware) that can be executed by the microprocessor or the processor, a logic gate, a switch, an application-specific integrated circuit (ASIC), a programmable logic controller, or a built-in microprocessor. Examples of the controller include but are not limited to the following microprocessors: ARC 625D, Atmel AT91SAM, Microchip PIC18F26K20, and Silicone Labs C8051F320. The memory controller can also be implemented as a part of the control logic of the memory. A person skilled in the art also knows that, in addition to implementing the controller by using the computer-readable program code, logic programming can be performed on method steps to allow the controller to implement the same function in forms of the logic gate, the switch, the application-specific integrated circuit, the programmable logic controller, and the built-in microcontroller. Therefore, the controller can be considered as a hardware component, and an apparatus configured to implement various functions in the controller can also be considered as a structure in the hardware component. Or the apparatus configured to implement various functions can even be considered as both a software module implementing the method and a structure in the hardware component.

The system, apparatus, module, or unit illustrated in the previous implementations can be implemented by using a computer chip or an entity, or can be implemented by using a product having a certain function. A typical implementation device is a computer. The computer can be, for example, a personal computer, a laptop computer, a cellular phone, a camera phone, a smartphone, a personal digital assistant, a media player, a navigation device, an email device, a game console, a tablet computer, or a wearable device, or a combination of any of these devices.

For ease of description, the apparatus above is described by dividing functions into various units. Certainly, when the present application is implemented, a function of each unit can be implemented in one or more pieces of software and/or hardware.

A person skilled in the art should understand that implementation of the present disclosure can be provided as a method, a system, or a computer program product. Therefore, the present disclosure can use a form of hardware only implementations, software-only implementations, or implementations with a combination of software and hardware. In addition, the present disclosure can use a form of a computer program product that is implemented on one or more computer-usable storage media (including but not limited to a disk memory, a CD-ROM, an optical memory, etc.) that include computer-usable program code.

The present disclosure is described with reference to the flowcharts and/or block diagrams of the method, the device (system), and the computer program product based on the implementations of the present disclosure. It is worthwhile to note that computer program instructions can be used to implement each process and/or each block in the flowcharts and/or the block diagrams and a combination of a process and/or a block in the flowcharts and/or the block diagrams. These computer program instructions can be provided for a general-purpose computer, a dedicated computer, an embedded processor, or a processor of another programmable data processing device to generate a machine, so that the instructions executed by the computer or the processor of another programmable data processing device generate a device for implementing a specific function in one or more processes in the flowcharts and/or in one or more blocks in the block diagrams.

These computer program instructions can be stored in a computer-readable memory that can instruct the computer or another programmable data processing device to work in a specific way, so that the instructions stored in the computer-readable memory generate an artifact that includes an instruction device. The instruction device implements a specific function in one or more processes in the flowcharts and/or in one or more blocks in the block diagrams.

These computer program instructions can be loaded onto the computer or another programmable data processing device, so that a series of operations and operations and steps are performed on the computer or another programmable device, thereby generating computer-implemented processing. Therefore, the instructions executed on the computer or another programmable device provide steps for implementing a specific function in one or more processes in the flowcharts and/or in one or more blocks in the block diagrams.

In a typical configuration, a computing device includes one or more processors (CPU), an input/output interface, a network interface, and a memory.

The memory can include a non-persistent memory, a random access memory (RAM), a non-volatile memory, and/or another form that are in a computer-readable medium, for example, a read-only memory (ROM) or a flash memory (flash RAM). The memory is an example of the computer-readable medium.

The computer-readable medium includes persistent, non-persistent, movable, and unmovable media that can store information by using any method or technology. The information can be a computer-readable instruction, a data structure, a program module, or other data. Examples of a computer storage medium include but are not limited to a phase change memory (PRAM), a static random access memory (SRAM), a dynamic random access memory (DRAM), another type of random access memory (RAM), a read-only memory (ROM), an electrically erasable programmable read-only memory (EEPROM), a flash memory or another memory technology, a compact disc read-only memory (CD-ROM), a digital versatile disc (DVD) or another optical storage, a cassette magnetic tape, a magnetic tape/magnetic disk storage or another magnetic storage device. The computer storage medium can be used to store information accessible to the computing device. Based on the definition in the present specification, the computer-readable medium does not include transitory computer-readable media (transitory media) such as a modulated data signal and carrier.

It is worthwhile to further note that, the terms "include", "comprise", or their any other variants are intended to cover a non-exclusive inclusion, and therefore a process, a method, a product or a device that includes a list of elements not only includes those elements but also includes other elements which are not expressly listed, or further includes elements inherent to such process, method, product or device. Without more constraints, an element preceded by "includes a . . . " does not preclude the existence of additional identical elements in the process, method, product or device that includes the element.

A person skilled in the art should understand that an implementation of the present application can be provided as a method, a system, or a computer program product. Therefore, the present application can use a form of hardware only implementations, software only implementations, or implementations with a combination of software and hardware. In addition, the present application can use a form of a computer program product that is implemented on one or more computer-usable storage media (including but not limited to a disk memory, a CD-ROM, an optical memory, etc.) that include computer-usable program code.

The present application can be described in the general context of computer-executable instructions executed by a computer, for example, a program module. Generally, the program module includes a routine, a program, an object, a component, a data structure, etc. executing a specific task or implementing a specific abstract data type. The present application can also be practiced in distributed computing environments. In the distributed computing environments, tasks are performed by remote processing devices connected through a communications network. In a distributed computing environment, the program module can be located in both local and remote computer storage media including storage devices.

The implementations in the present specification are described in a progressive way. For same or similar parts of the implementations, references can be made to the implementations. Each implementation focuses on a difference from other implementations. Particularly, a system implementation is basically similar to a method implementation, and therefore, is described briefly. For related parts, references can be made to related descriptions in the method implementation.

The previous implementations are implementations of the present application, and are not intended to limit the present application. A person skilled in the art can make various modifications and changes to the present application. Any modification, equivalent replacement, or improvement made without departing from the spirit and principle of the present application shall fall within the scope of the claims in the present application.

Figure 5:
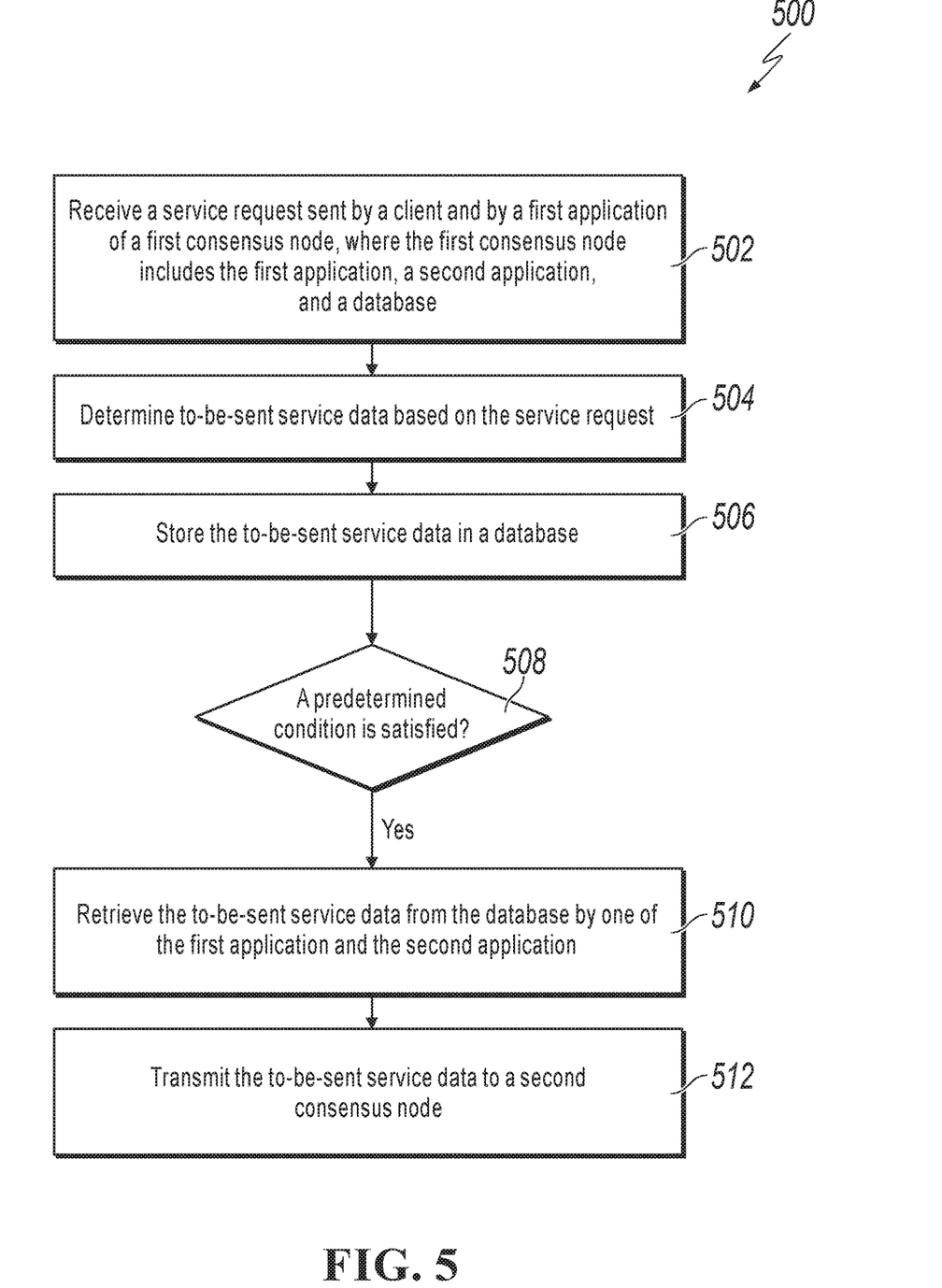
FIG. 5 is a flowchart illustrating an example of a computer-implemented method for handling a blockchain service, according to an implementation of the present disclosure.

FIG. 5 is a flowchart illustrating an example of a computer-implemented method 500 for handling a blockchain service, according to an implementation of the present disclosure. For clarity of presentation, the description that follows generally describes method 500 in the context of the other figures in this description. However, it will be understood that method 500 can be performed, for example, by any system, environment, software, and hardware, or a combination of systems, environments, software, and hardware, as appropriate. In some implementations, various steps of method 500 can be run in parallel, in combination, in loops, or in any order.

At 502, a service request sent by a client is received by a first application of a first consensus node of a blockchain network, where the first consensus node includes the first application, a second application, and a database. After 502, method 500 proceeds to 504.

At 504, to-be-sent service data is determined based on the service request. After 504, method 500 proceeds to 506.

At 506, the to-be-sent service data is stored in the database by the first application. After 506, method 500 proceeds to 508.

At 508, a determination is made as to whether a predetermined condition is satisfied. In some implementations, determining whether the predetermined condition is satisfied comprises determining whether the predetermined condition is satisfied when a time condition is satisfied.

If it is determined that the predetermined condition is satisfied, method 500 proceeds to 510.

At 510, the to-be-sent service data is retrieved from the database by at least one of the first application or the second application. In some implementations, retrieving the to-be-sent service data from the database includes retrieving a specified amount of the to-be-sent service data from the database. After 510, method 500 proceeds to 512.

At 512, the to-be-sent service data is transmitted to a second consensus node of the blockchain network.

In some implementations, method 500 further includes: prior to storing the to-be-sent service data, determining a state associated with the to-be-sent service data is a to-be-sent state; and storing the to-be-sent service data and the to-be-sent state associated with the to-be-sent service data in the database.

In some implementations, method 500 further includes updating a state associated with the to-be-sent service data to a sent state. In such implementations, method 500 further includes receiving consensus data from a another consensus node; and storing the received consensus data in the database, wherein the stored consensus data and service data in the sent state are subsequently fetched by a second application to perform a consensus verification, and wherein the second application is included in the first consensus node.

In such implementations, a verification result that is generated by the consensus verification is added to the consensus data, and wherein the verification result is stored in the database. After 512, method 500 stops.

Implementations of the present application can solve technical problems in handling a blokchain service. Traditionally, data that is not stored in a blockchain is temporarily stored in a cache of a consensus node. Therefore, when the consensus verification is performed, an amount of verifictaion service data is limited by a cache capacity of the individual consensus nodes, thereby limiting the efficiency of the consensus verification. In addition, when the cache space of the consensus node is insufficient, a consensus node can have difficulty in processing the received service request. What is needed is a technique to bypass these problems in the conventional methods, and to provide a more efficient solution for processing and storing service data corresponding to a blockchains service request.

This specification describes methods and apparatuses for improving service data processing based on blockchain technologies. In one example, a first application, a second application, and a database are included in the consensus node. The database is configured to store service data obtained after the first application and the second application perform service processing. In this way, the cache pressure on the consensus node can be reduced. In addition, the consensus node can receive a service request and handle a service even while waiting for a consensus, without causing service waiting due to insufficient cache space. Moreover, because the service data is stored in the database, the number of installed applications may be increased for the consensus node based on various needs. Therefore, the consensus node can receive and process a higher volume of service requests, thereby improviding the working efficiency of the consensus node. Also, when a predetermined condition is satisfied, the first application or the second application in the consensus node can fetch to-be-sent service data stored in the database, and send the to-be-sent service data to another consensus node for storage, thereby improving the load balancing characteristics of the system.

Utilizing the techniques described in this specification, service data is migrated to a database for storage, thereby increasing the data storage capacity of the cache associated with each consensus node and improving the data processing speed of the consensus node. In this way, operation efficiency of the consensus node can be increased, as it is not restrained by the cache volume. In addition, all applications included in the consensus node can handle service requests and transmit service data. Therefore, the consensus node can delegate the sending of to-be-sent service data to some applications, and the handling of service request to the other applications, thereby improving consensus verification efficiency and service request processing efficiency of the consensus node.

Embodiments and the operations described in this specification can be implemented in digital electronic circuitry, or in computer software, firmware, or hardware, including the structures disclosed in this specification or in combinations of one or more of them. The operations can be implemented as operations performed by a data processing apparatus on data stored on one or more computer-readable storage devices or received from other sources. A data processing apparatus, computer, or computing device may encompass apparatus, devices, and machines for processing data, including by way of example a programmable processor, a computer, a system on a chip, or multiple ones, or combinations, of the foregoing. The apparatus can include special purpose logic circuitry, for example, a central processing unit (CPU), a field programmable gate array (FPGA) or an application-specific integrated circuit (ASIC). The apparatus can also include code that creates an execution environment for the computer program in question, for example, code that constitutes processor firmware, a protocol stack, a database management system, an operating system (for example an operating system or a combination of operating systems), a cross-platform runtime environment, a virtual machine, or a combination of one or more of them. The apparatus and execution environment can realize various different computing model infrastructures, such as web services, distributed computing and grid computing infrastructures.

A computer program (also known, for example, as a program, software, software application, software module, software unit, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A program can be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program can be executed on one computer or on multiple computers that are located at one site or distributed across multiple sites and interconnected by a communication network.

Processors for execution of a computer program include, by way of example, both general- and special-purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data. A computer can be embedded in another device, for example, a mobile device, a personal digital assistant (PDA), a game console, a Global Positioning System (GPS) receiver, or a portable storage device. Devices suitable for storing computer program instructions and data include non-volatile memory, media and memory devices, including, by way of example, semiconductor memory devices, magnetic disks, and magneto-optical disks. The processor and the memory can be supplemented by, or incorporated in, special-purpose logic circuitry.

Mobile devices can include handsets, user equipment (UE), mobile telephones (for example, smartphones), tablets, wearable devices (for example, smart watches and smart eyeglasses), implanted devices within the human body (for example, biosensors, cochlear implants), or other types of mobile devices. The mobile devices can communicate wirelessly (for example, using radio frequency (RF) signals) to various communication networks (described below). The mobile devices can include sensors for determining characteristics of the mobile device's current environment. The sensors can include cameras, microphones, proximity sensors, GPS sensors, motion sensors, accelerometers, ambient light sensors, moisture sensors, gyroscopes, compasses, barometers, fingerprint sensors, facial recognition systems, RF sensors (for example, Wi-Fi and cellular radios), thermal sensors, or other types of sensors. For example, the cameras can include a forward- or rear-facing camera with movable or fixed lenses, a flash, an image sensor, and an image processor. The camera can be a megapixel camera capable of capturing details for facial and/or iris recognition. The camera along with a data processor and authentication information stored in memory or accessed remotely can form a facial recognition system. The facial recognition system or one-or-more sensors, for example, microphones, motion sensors, accelerometers, GPS sensors, or RF sensors, can be used for user authentication.

To provide for interaction with a user, embodiments can be implemented on a computer having a display device and an input device, for example, a liquid crystal display (LCD) or organic light-emitting diode (OLED)/virtual-reality (VR)/augmented-reality (AR) display for displaying information to the user and a touchscreen, keyboard, and a pointing device by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments can be implemented using computing devices interconnected by any form or medium of wireline or wireless digital data communication (or combination thereof), for example, a communication network. Examples of interconnected devices are a client and a server generally remote from each other that typically interact through a communication network. A client, for example, a mobile device, can carry out transactions itself, with a server, or through a server, for example, performing buy, sell, pay, give, send, or loan transactions, or authorizing the same. Such transactions may be in real time such that an action and a response are temporally proximate; for example an individual perceives the action and the response occurring substantially simultaneously, the time difference for a response following the individual's action is less than 1 millisecond (ms) or less than 1 second (s), or the response is without intentional delay taking into account processing limitations of the system.

Examples of communication networks include a local area network (LAN), a radio access network (RAN), a metropolitan area network (MAN), and a wide area network (WAN). The communication network can include all or a portion of the Internet, another communication network, or a combination of communication networks. Information can be transmitted on the communication network according to various protocols and standards, including Long Term Evolution (LTE), 5G, IEEE 802, Internet Protocol (IP), or other protocols or combinations of protocols. The communication network can transmit voice, video, biometric, or authentication data, or other information between the connected computing devices.

Features described as separate implementations may be implemented, in combination, in a single implementation, while features described as a single implementation may be implemented in multiple implementations, separately, or in any suitable sub-combination. Operations described and claimed in a particular order should not be understood as requiring that the particular order, nor that all illustrated operations must be performed (some operations can be optional). As appropriate, multitasking or parallel-processing (or a combination of multitasking and parallel-processing) can be performed.

What is claimed is:

1. A computer-implemented method for handling a blockchain service, comprising:
   receiving, by a first application of a first consensus node of a blockchain network, a service request sent by a client, wherein the first consensus node comprises the first application, a second application, and a database;
   determining to-be-sent service data based on the service request;
   storing, by the first application, the to-be-sent service data in the database;
   determining based on an identifier of the to-be-sent service data that the to-be-sent service data satisfies a predetermined condition that changes with time changes and service volume changes, wherein the predetermined condition defines a data volume corresponding to the first consensus node to be retrieved within a time interval, and wherein the predetermined condition comprises an increase of the time interval for retrieving the data volume during nighttime;
   in response to determining that the predetermined condition is satisfied, retrieving, by the first application or the second application, the to-be-sent service data from the database; and
   transmitting the to-be-sent service data to a second consensus node of the blockchain network.

2. The computer-implemented method of claim 1, further comprising:
   prior to storing the to-be-sent service data:
      determining, by the first application, a state associated with the to-be-sent service data is a to-be-sent state; and
      storing the to-be-sent service data and the to-be-sent state associated with the to-be-sent service data in the database.

3. The computer-implemented method of claim 1, wherein the predetermined condition defines a first data volume to be retrieved within a first time interval during nighttime and a second data volume to be retrieved within a second time interval during daytime, the first data volume being larger than the second data volume.

4. The computer-implemented method of claim 1, wherein retrieving the to-be-sent service data from the database comprises retrieving a specified amount of the to-be-sent service data from the database.

5. The computer-implemented method of claim 1, further comprising:
   updating a state associated with the to-be-sent service data to a sent state.

6. A computer-implemented method for performing a consensus process in a blockchain network, comprising:
   receiving, by a first application of a first consensus node of the blockchain network, consensus data, wherein the first consensus node includes the first application, a second application, and a first database;
   storing, by the first application, the consensus data in the first database;
   retrieving, by the second application from the first database, the consensus data;
   performing, by the second application, a consensus verification based on the consensus data;
   generating, by the second application, a verification result of the consensus verification based on the consensus data;
   adding, by the second application, the verification result into the consensus data;
   storing, by the second application, the consensus data that includes the verification result in the first database;
   determining based on an identifier of the consensus data that the consensus data satisfies a predetermined condition that changes with time changes and service volume changes, wherein the predetermined condition defines a data volume corresponding to the first consensus node to be retrieved within a time interval, and wherein the predetermined condition comprises an increase of the time interval for retrieving the data volume during nighttime;
   in response to determining that the predetermined condition is satisfied, retrieving, by the first application or the second application, the consensus data from the database; and
   sending, by the second application, the consensus data to a second consensus node.

7. The computer-implemented method of claim 6, wherein receiving, by the first application of the first consensus node of the blockchain network, the consensus data comprises:
   receiving, by the first application of the first consensus node of the blockchain network, the consensus data from the second consensus node of the blockchain network; or
   receiving, by the first application of the first consensus node of the blockchain network, the verification result from a third consensus node of the blockchain network as the consensus data.

8. The computer-implemented method of claim 6, wherein retrieving, by the second application from the first database, the consensus data comprises:
   retrieving, by the second application from the first database, the consensus data and service data that has a sent state;
   performing, by the second application, a consensus verification based on the service data that has the sent state; and
   generating the verification result of the consensus verification based on the service data that has the sent state.

9. The computer-implemented method of claim 8, wherein the second consensus node includes a third application, a fourth application, and a second database, prior to receiving, by the first application of the first consensus node of the blockchain network, the method comprising:
   identifying, by the third application, the consensus data based on the service data that has the sent state;
   storing, by the third application, the consensus data in the second database;
   retrieving, by the fourth application from the second database, the consensus data; and
   sending, by the fourth application, the consensus data to consensus nodes of the blockchain network other than the second consensus node.

10. The computer-implemented method of claim 6, wherein performing, by the second application, a consensus verification based on the consensus data comprises performing, by the second application, the consensus verification based on the consensus data using a Practical Byzantine Fault Tolerance (PBFT) algorithm.

11. A non-transitory, computer-readable medium storing one or more instructions executable by a computer system to perform operations comprising:
  receiving, by a first application of a first consensus node of a blockchain network, a service request sent by a client, wherein the first consensus node includes the first application, a second application, and a database;
  determining to-be-sent service data based on the service request;
  storing, by the first application, the to-be-sent service data in the database;
  determining based on an identifier of the to-be-sent service data that the to-be-sent service data satisfies a predetermined condition that changes with time changes and service volume changes, wherein the predetermined condition defines a data volume corresponding to the first consensus node to be retrieved within a time interval, and wherein the predetermined condition comprises an increase of the time interval for retrieving the data volume during nighttime;
  in response to determining that the predetermined condition is satisfied, retrieving, by the first application or the second application, the to-be-sent service data from the database; and
  transmitting the to-be-sent service data to a second consensus node of the blockchain network.

12. The non-transitory, computer-readable medium of claim 11, the operations further comprising:
  prior to storing the to-be-sent service data:
    determining, by the first application, a state associated with the to-be-sent service data is a to-be-sent state; and
    storing the to-be-sent service data and the to-be-sent state associated with the to-be-sent service data in the database.

13. The non-transitory, computer-readable medium of claim 11, wherein the predetermined condition defines a first data volume to be retrieved within a first time interval during nighttime and a second data volume to be retrieved within a second time interval during daytime, the first data volume being larger than the second data volume.

14. The non-transitory, computer-readable medium of claim 11, wherein retrieving the to-be-sent service data from the database comprises retrieving a specified amount of the to-be-sent service data from the database.

15. The non-transitory, computer-readable medium of claim 11, the operations further comprising:
  updating a state associated with the to-be-sent service data to a sent state.

16. A computer-implemented system, comprising:
  one or more computers; and
  one or more computer memory devices interoperably coupled with the one or more computers and having tangible, non-transitory, machine-readable media storing one or more instructions that, when executed by the one or more computers, perform one or more operations comprising:
    receiving, by a first application of a first consensus node of a blockchain network, a service request sent by a client, wherein the first consensus node includes the first application, a second application, and a database;
    determining to-be-sent service data based on the service request;
    storing, by the first application, the to-be-sent service data in the database;
    determining based on an identifier of the to-be-sent service data that the to-be-sent service data satisfies a predetermined condition that changes with time changes and service volume changes, wherein the predetermined condition defines a data volume corresponding to the consensus node to be retrieved within a time interval, and wherein the predetermined condition comprises an increase of the time interval for retrieving the data volume during nighttime;
    in response to determining that the predetermined condition is satisfied, retrieving, by the first application or the second application, the to-be-sent service data from the database; and
    transmitting the to-be-sent service data to a second consensus node of the blockchain network.

17. The computer-implemented system of claim 16, the one or more operations further comprising:
  prior to storing the to-be-sent service data:
    determining, by the first application, a state associated with the to-be-sent service data is a to-be-sent state; and
    storing the to-be-sent service data and the to-be-sent state associated with the to-be-sent service data in the database.

18. The computer-implemented system of claim 16, wherein determining whether the predetermined condition is satisfied comprises determining whether the predetermined condition is satisfied when a time condition is satisfied.

19. The computer-implemented system of claim 16, wherein retrieving the to-be-sent service data from the database comprises retrieving a specified amount of the to-be-sent service data from the database.

20. The computer-implemented system of claim 16, the one or more operations further comprising:
  updating a state associated with the to-be-sent service data to a sent state.

* * * * *

UNITED STATES PATENT AND TRADEMARK OFFICE
CERTIFICATE OF CORRECTION

PATENT NO. : 10,938,577 B2  
APPLICATION NO. : 16/502523  
DATED : March 2, 2021  
INVENTOR(S) : Tang Page 1 of 1

It is certified that error appears in the above-identified patent and that said Letters Patent is hereby corrected as shown below:

On the Title Page

Item (71), After "Applicant:", delete "Alibaba Group Holdiing Limited, George Town, KY," and insert -- Advanced New Technologies Co., Ltd., Grand Cayman (KY) --, therefor.

Signed and Sealed this  
Fifteenth Day of March, 2022

Drew Hirshfeld  
*Performing the Functions and Duties of the*  
*Under Secretary of Commerce for Intellectual Property and*  
*Director of the United States Patent and Trademark Office*